US012299471B2

United States Patent
Liu et al.

(10) Patent No.: US 12,299,471 B2
(45) Date of Patent: *May 13, 2025

(54) VIRTUALIZING HARDWARE COMPONENTS THAT IMPLEMENT AI APPLICATIONS

(71) Applicant: VMware LLC, Palo Alto, CA (US)

(72) Inventors: Qi Liu, Beijing (CN); Xiangjun Song, Beijing (CN); Jin He, Beijing (CN); Xiangdong Che, Beijing (CN); Bing Niu, Beijing (CN); Sheng Fang, Beijing (CN)

(73) Assignee: VMware LLC, Palo Alto, CA (US)

( * ) Notice: Subject to any disclaimer, the term of this patent is extended or adjusted under 35 U.S.C. 154(b) by 108 days.

This patent is subject to a terminal disclaimer.

(21) Appl. No.: 17/670,661

(22) Filed: Feb. 14, 2022

(65) Prior Publication Data
US 2022/0164216 A1    May 26, 2022

Related U.S. Application Data

(63) Continuation of application No. 16/502,627, filed on Jul. 3, 2019, now Pat. No. 11,249,786.

(51) Int. Cl.
*G06F 9/455* (2018.01)
*G06N 5/02* (2023.01)
*G06N 20/00* (2019.01)

(52) U.S. Cl.
CPC ......... *G06F 9/45558* (2013.01); *G06N 5/027* (2013.01); *G06N 20/00* (2019.01);
(Continued)

(58) Field of Classification Search
CPC ......... G06F 9/45558; G06F 2009/4557; G06F 2009/45579; G06F 9/4411; G06F 9/45533;
(Continued)

(56) References Cited

U.S. PATENT DOCUMENTS 9,910,689 B2   3/2018  Nair
11,249,786 B2 *  2/2022  Liu .................... G06N 5/027
(Continued)

FOREIGN PATENT DOCUMENTS

WO    WO2020231952    11/2020

OTHER PUBLICATIONS

Vasilas, Dimitrios , "VGVM: Efficient GPU Capabilities in Virtual Machines", 2016, IEEE, pp. 637-6444 (Year: 2016).

*Primary Examiner* — Kenneth Tang
(74) *Attorney, Agent, or Firm* — King Intellectual Asset Management

(57) ABSTRACT

A computing environment can include a host system that maintains a guest system, and a hardware component configured to implement artificial intelligence ("AI") methods of processing and analyzing date. The guest system can provide a virtual computing environment that receives a request to implement an AI application, and utilize a framework and a guest library to convert data from the AI application into an intermediate representation ("IR"). The host system can receive the IR with a virtual device ("VD"), and utilize an IR backend to translate the IR into hardware operations for the hardware component. Translated hardware operations can be provided to, and carried out by, the hardware component to provide an implementation of the AI application. Results of the hardware operations can be transmitted from the VD of the host system to a VD driver of the guest system, virtualizing the hardware component relative to the guest system.

20 Claims, 8 Drawing Sheets

(52) U.S. Cl.
CPC ............... *G06F 2009/4557* (2013.01); *G06F 2009/45579* (2013.01)

(58) Field of Classification Search
CPC ........ G06N 5/027; G06N 20/00; G06N 3/105; G06N 3/08
See application file for complete search history.

(56) References Cited

U.S. PATENT DOCUMENTS

| | | | |
|---|---|---|---|
| 11,797,876 B1* | 10/2023 | Wang | G06N 3/0464 |
| 2007/0067769 A1* | 3/2007 | Geisinger | G06F 9/45537 718/1 |
| 2018/0074843 A1* | 3/2018 | Smith | G06F 9/45558 |
| 2018/0210747 A1* | 7/2018 | Smith | G06F 9/50 |
| 2018/0357047 A1* | 12/2018 | Brown | G06V 10/94 |
| 2019/0114283 A1* | 4/2019 | Deval | G06F 13/4221 |
| 2019/0379683 A1 | 12/2019 | Overby | |
| 2020/0250510 A1* | 8/2020 | Kumar Addepalli | G06N 3/042 |
| 2020/0401440 A1* | 12/2020 | Sankaran | G06F 9/3842 |
| 2022/0147395 A1* | 5/2022 | Guim Bernat | G06F 9/45533 |
| 2022/0230268 A1* | 7/2022 | Yao | G06N 7/01 |
| 2022/0358370 A1* | 11/2022 | Guim Bernat | H04L 41/16 |

* cited by examiner

VIRTUALIZING HARDWARE COMPONENTS THAT IMPLEMENT AI APPLICATIONS

This application claims priority as a continuation of U.S. patent application Ser. No. 16/502,627, entitled "Virtualizing Hardware Components that Implement AI Applications," filed Jul. 3, 2019, which is incorporated by reference herein in its entirety.

BACKGROUND

Artificial intelligence ("AI") is recognized as an area of computer engineering directed to, among other things, machines configured to learn from experience, adjust to new inputs, and perform human-like tasks. Machine learning is a type of AI, or implementation of AI that is known in the art, and may include, for example, a computing device that processes large amounts of data, recognizes patterns in the data, and as a result of these processes becomes trained to accomplish specific tasks. In this example, the amount of data, and the execution of the data processing and recognition for training the computing device may define a workload requiring a minimum level of computing resources or data processing ("AI workload") specific to applications that implement some type of AI information processing and analysis ("AI applications"). A volume of data, number of processes, processing times, and minimum expenditure of resources associated with AI workloads place significant requirements on hardware computing resources charged with carrying out these AI applications. For many AI applications, traditionally available computing resources, like a general-purpose computer programing unit ("CPU") are not capable of handling AI workloads.

As a result, to meet this demand, there has been an influx in the creation of hardware, including chips and intellectual property ("IP")/IP cores, specifically built for AI applications. Some types of hardware that have been targets for either improvement or new development include graphics processing units ("GPU"), digital signal processors ("DSP"), application specific integrated circuits ("ASIC"), field programmable gate arrays ("FPGA"), and deep neural nets ("DNN"). For an AI application, one or a combination of two or more of the above types of hardware may define an AI hardware accelerator ("AIHA") resource required to implement that AI application. Generally speaking, an AIHA resource is a class of microprocessor, computer system, or other computing device that is designed for acceleration of an application that incorporate a method of AI processing and analysis such as an artificial neural network, machine vision, machine learning, or the like. However, each instance of hardware, for example, a GPU or a DSP, alone or in combination, may respectively differ with regard to components, operational capabilities, or I/O requirements.

Different AI applications may incorporate one or more AI-specific methods for information processing and analysis. Each method may be best suited for a specific environment, such as a cloud computing system, a data center, or embedded/edge systems. For example, the "training" that may occur in an AI application that implements machine learning may require the use of algorithms to understand data. The training may involve the development of the algorithm's ability to understand a data set. This type of method may be well suited for a data center, but less likely to be incorporated in an embedded/edge computing environment. On the other hand, some AI applications implement an "inference" AI methodology where hardware acts on a new data sample to infer an answer to a query. This method may be employed in a data center or embedded/edge environments.

The different methods may have different computing resource requirements that may demand different hardware solutions. Some training methods may employ massive parallelism, and typically use floating-point data; whereas some inference methods employ less parallelism relative to training methods, and may shift to lower-resolution or integer data. With respect to the hardware examples previously mentioned: GPUs can offer massively parallel floating-point engines; DSPs may offer single instruction multiple data engines for parallel integer math; some ASICs can offer specialized custom architectures, for example TPU by GOOGLE; and FPGAs may provide flexible architectures. In some cases, the type of hardware required to implement a particular AI method may dictate in what environment the method may be employed.

To utilize an AIHA resource efficiently, an entire system of components and services may be required. A general structure of core component types may serve a as a starting point for using any type of AIHA resource. Although all of these systems may follow the same flow of information and have the same general architecture, in practice, each system may have its own version of a component type at each level of the architecture. The heterogeneity of components at each level produces numerous issues for developers and end users. Vendors and system developers must maintain tools from application level to a very low level, like drivers, and maintain these tools for different OS platforms and versions. Application developers must write applications for different platforms, and often must re-write programs for different platforms. End users must learn different platforms and deploy different environments for different hardware.

As a result, a need exists for a solution for virtualizing AIHA resources. Specifically, a solution is needed that optimizes hardware utilization for applications that implement different types of AI methods (machine learning, neural networks, deep machine learning, etc.) of information processing and analysis. In addition, a need exists for a solution that addresses issues of inefficiency that arise between different system architectures respectively utilized to implement one AI application due to heterogeneity at different component levels of the system architectures relative to each other.

SUMMARY

Examples described herein include systems and methods for virtualizing hardware components for executing AI workloads. In one example, a guest system, being implemented on a computing device and maintained by a host system, can receive a request to implement an AI application. The guest system can provide a virtual computing environment, such as that provided by a virtual machine ("VM"), and be configured to compile data from the AI application ("AI application data") to generate an intermediate representation ("IR").

In one example, the guest system can include and maintain; a guest library; and information defining a framework that is associated with the guest system, and which corresponds to one or more AI applications. In addition, the framework can define parameters of a model and an AI processing method for training the model. Further, the framework can provide a software environment that provides particular functionality to utilize definitions provided in the guest library and, together with the guest library, generate the IR. In one example, the IR may provide a representation of a program considered "between" a source language of an AI application and a target language of a hardware component associated with a host system. The host system may maintain the guest system including the guest library and framework.

The same IR can be used for different hardware drivers, allowing requests from virtual components to be translated into usable commands at the various hardware components that are available. In one example, an IR can be transmitted to a host system that translates the IR into hardware operations. The hardware operations can be specific to an available hardware component configured to implement an AI processing method, handle AI workloads, and thereby define an AIHA resource. In one example, the hardware component can be provided by a hardware-based AI accelerator such as a GPU, DSP, DNN, ASIC, or an FPGA. The host system can include an IR backend that is configured to translate the IR into hardware operations for an AI hardware component associated with the host system.

Once the IR is translated, in one example, translated hardware operations can be provided to a hardware component by a driver of an OS kernel for the host system. As a result, the hardware component can operate to perform the hardware operations defined in the IR, and thereby provide an implementation of an AI application for a guest system that generated the IR. Results of the hardware operations can be transmitted from the host system to the guest system.

A virtual device that is implemented by a hypervisor for a host system can be presented to an OS on a guest system through a virtual device driver also provided on the guest system. With the virtual device and virtual device driver according to the present disclosure, a unified interface between OS and hardware component kernels is provided. Through this interface, IRs following a common construct pursuant to a respective creation from a guest library, are transmitted from the guest system to a host system. Regardless of a type AI application, or framework being implemented on a guest device, or a type of AI hardware component configured to be operated in response to communications from a host system, the IR can be translated by an IR backend into operations for the hardware component that implement the AI application. As a result, different AI hardware components may be operated to implement the AI application even in a case where the AI hardware component has not been specifically designed for that AI application.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Examples described herein include systems and methods for virtualizing hardware components configured to handle processing activities on an order of AI workloads as defined herein. Such hardware components may include hardware-based AI accelerators as previously mentioned, and may be referred to in the instant disclosure as "hardware component," "hardware," or "AI hardware component." A guest system that provides a virtual computing environment can receive a request to implement an AI application. Using a framework and a guest library, the guest system can convert data from the AI application into an IR. A host system that maintains the guest system, can receive the IR with a virtual device ("VD") provided through a hypervisor for the host device. The VD can correspond with a VD driver of the guest system and establish a line of communication for transmittal of IRs between and within guest and host systems in accordance with implementations of respective send and receive queues for the VD and VD driver.

In one example, the VD can provide an IR backend maintained by a host kernel of the host system with the IR, or at least a data part of the IR. The IR backend, using an IR library, can translate the IR into hardware operations for a hardware component associated with the host system. The hardware component can be configured to implement AI applications and handle AI workloads. In one example, the hardware component can be provided by a hardware-based AI accelerator such as a GPU, DSP, DNN, or an FPGA.

Translated hardware operations can be provided to, and carried out by, the hardware component. The hardware component can operate to perform the one or more hardware operations defined in the IR and thereby provide an implementation of an AI application for a guest system that generated the IR. Results of the hardware operations can be transmitted from the host system to the guest system.

Figure 1A:
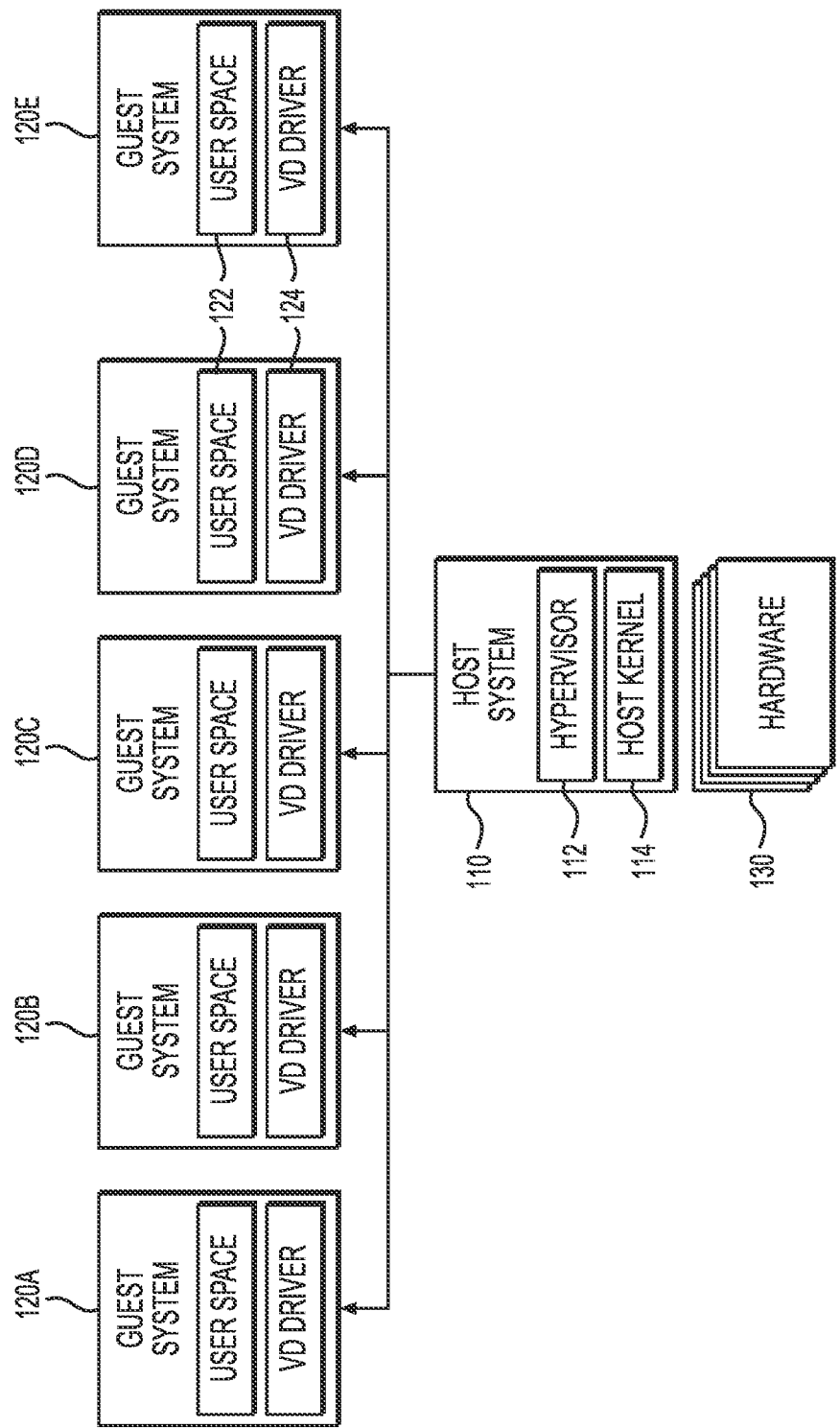
FIG. 1A is an exemplary illustration of system components for implementing a virtualized hardware component with respect to multiple guest systems.
Figure 1B:
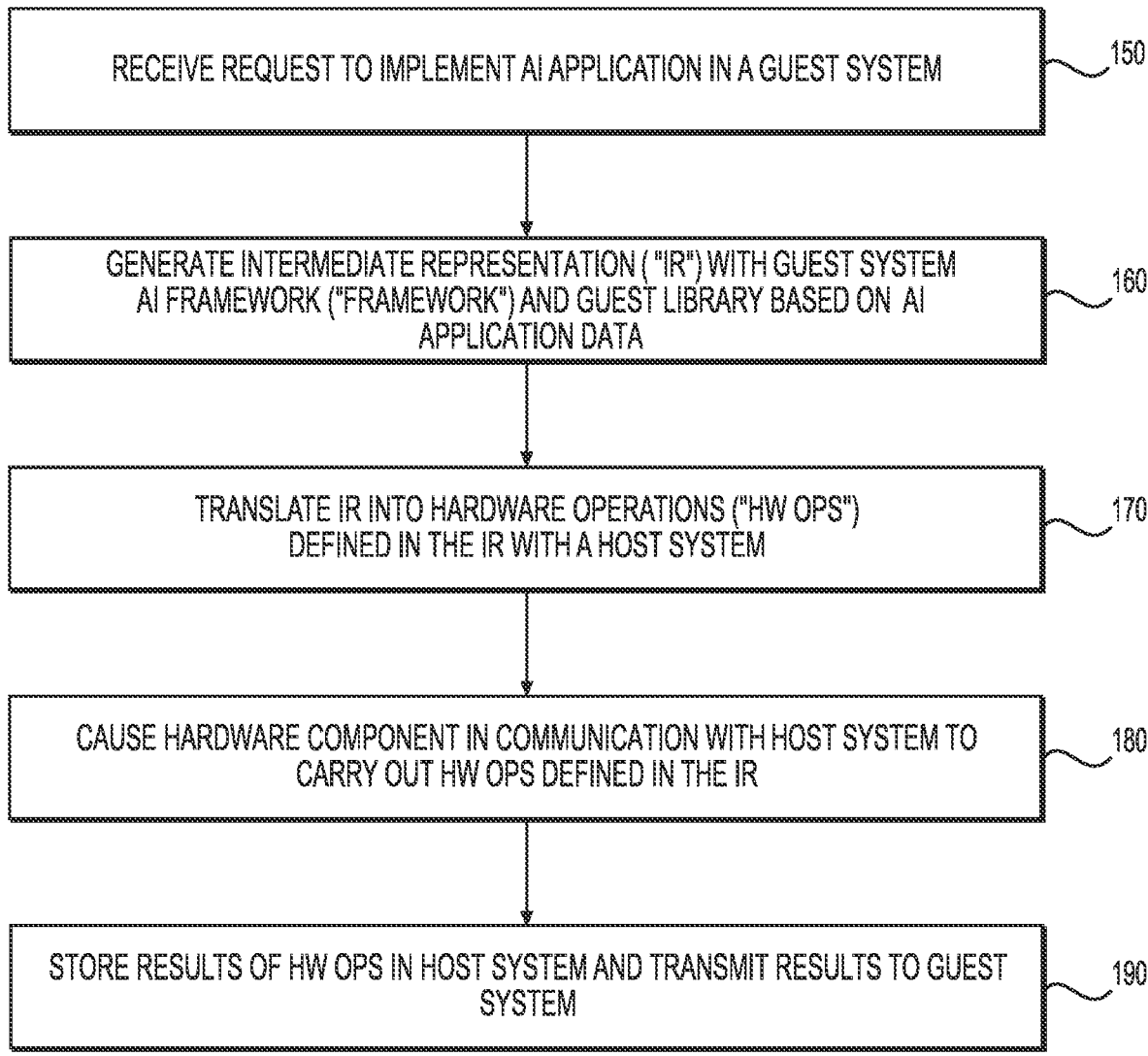
FIG. 1B is a flowchart of an exemplary method for implementing a hardware component configured to handle AI workloads through a virtualized environment.
Figure 2A:
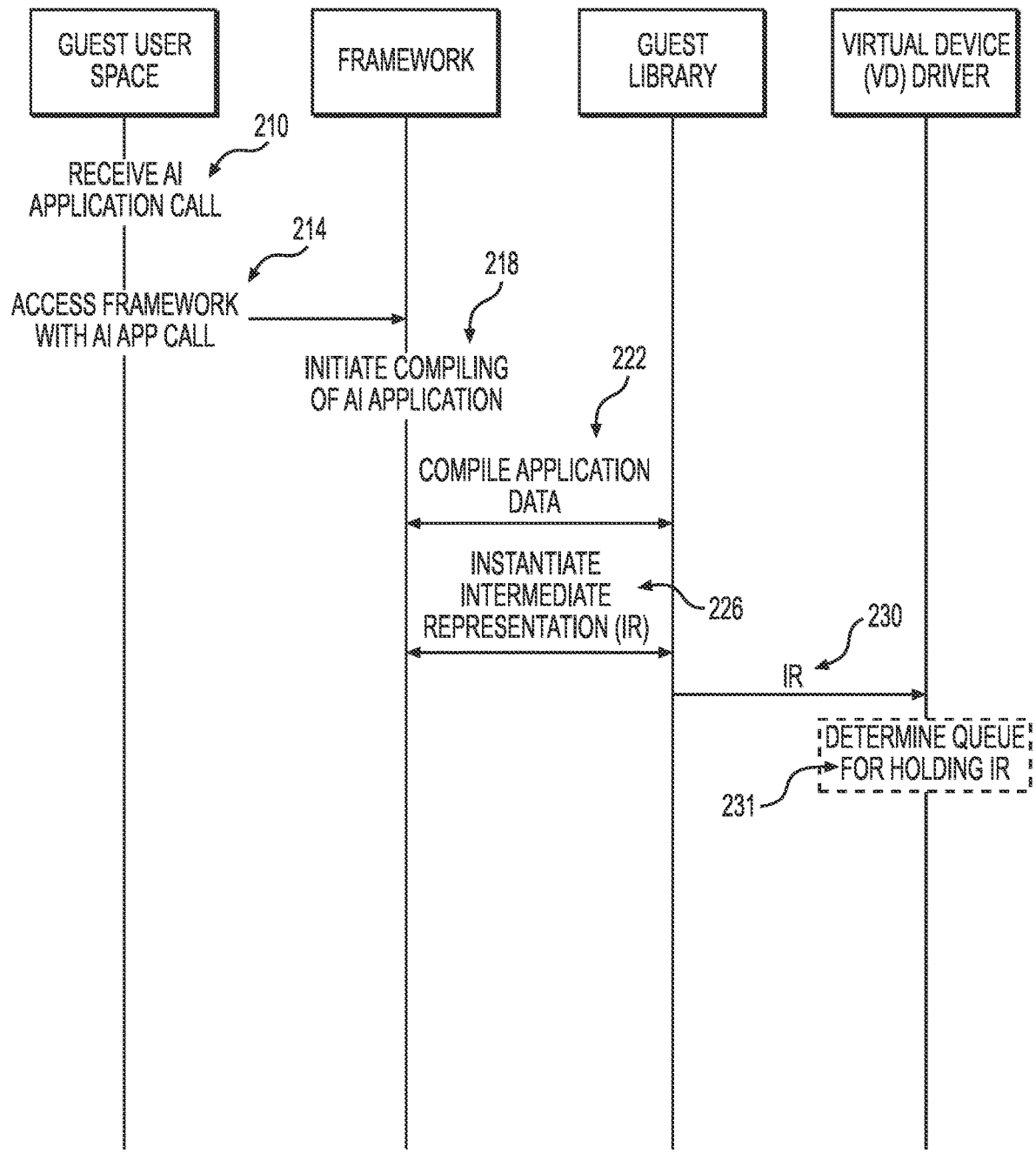
FIG. 2A provides a sequence diagram of an exemplary method for generating an IR.
Figure 2B:
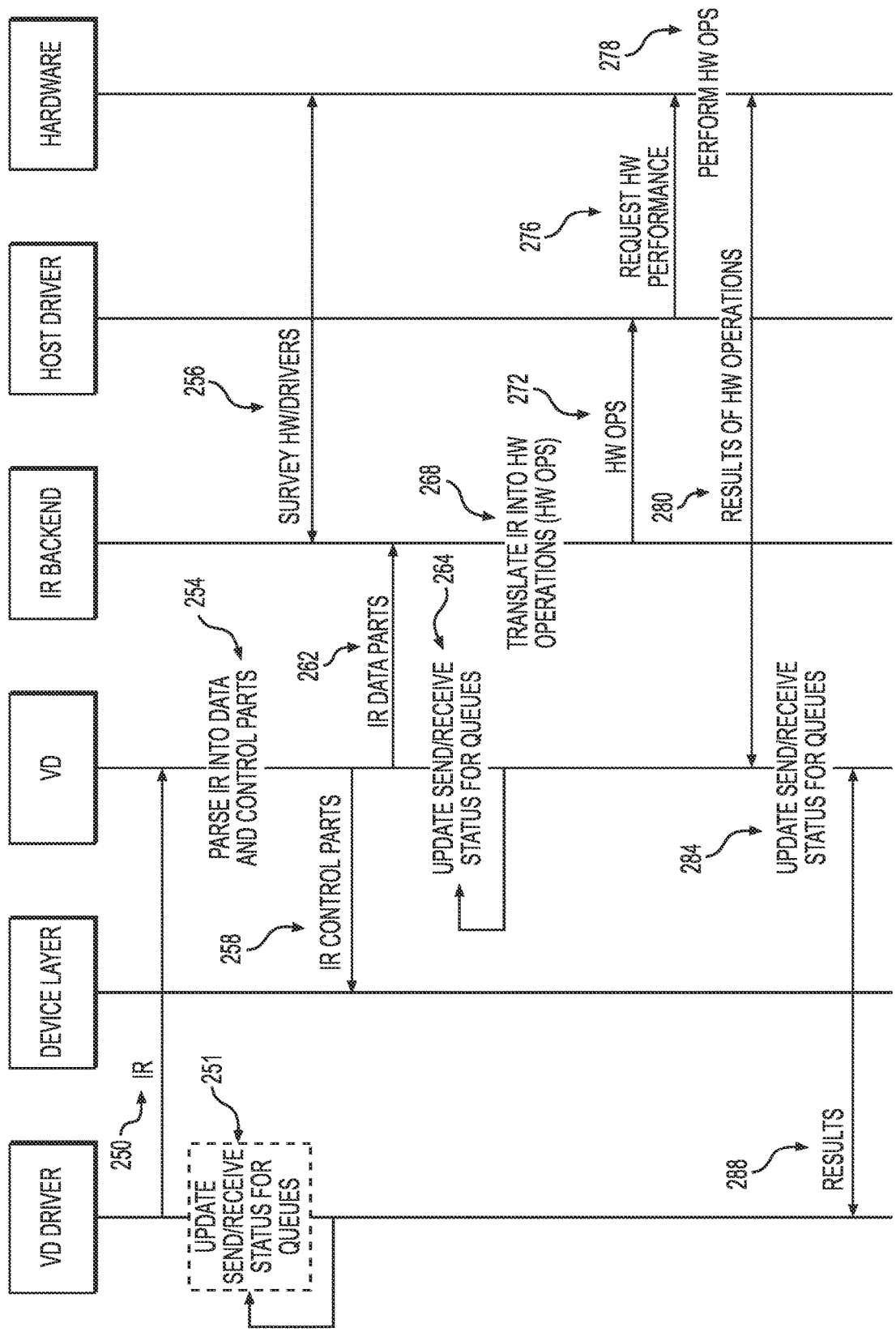
FIG. 2B provides a sequence diagram of an exemplary method of implementing an AI application with a hardware component through a virtualized environment.
Figure 3:
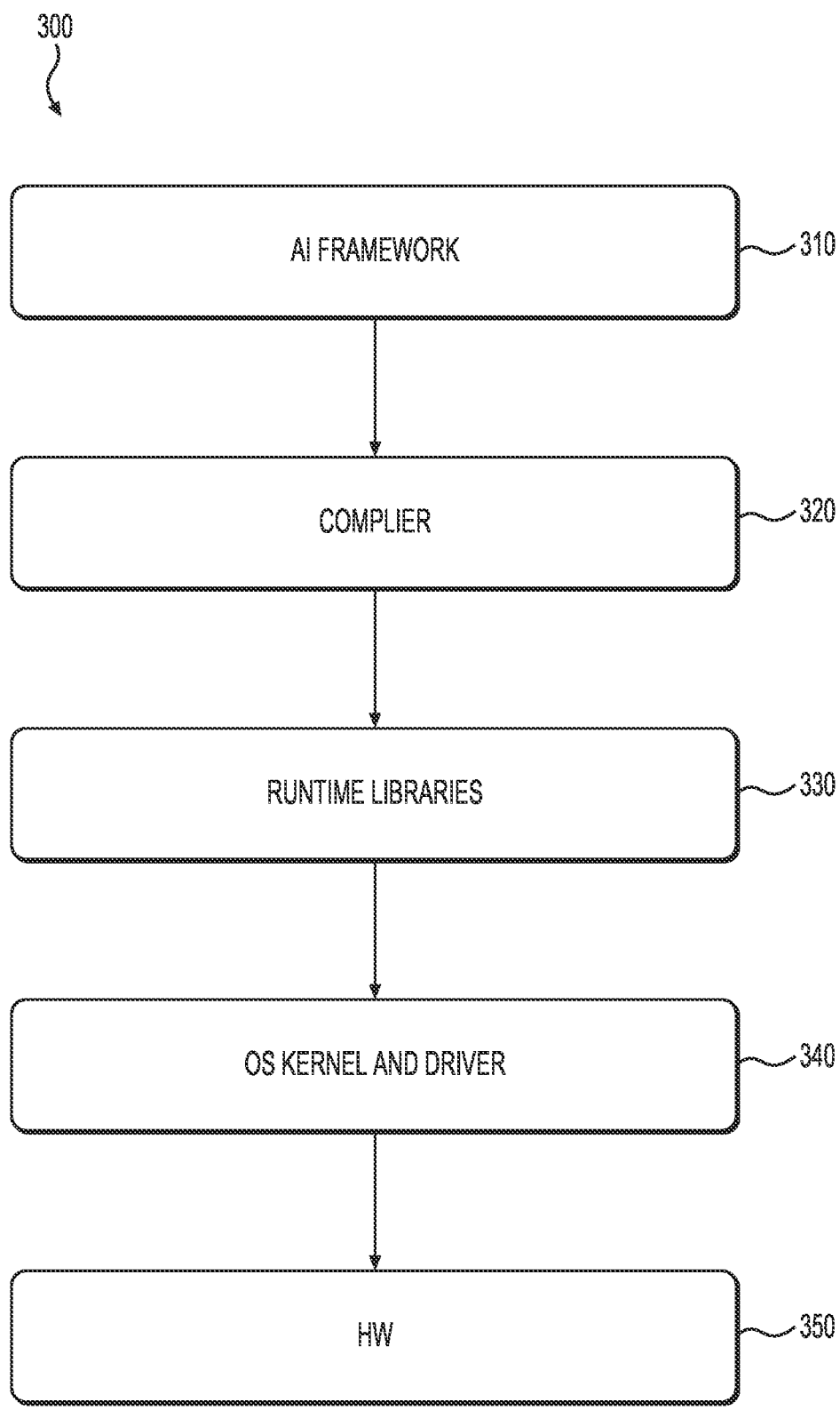
FIG. 3 illustrates an exemplary architecture for implementing an AI application ("AI architecture").
Figure 4:
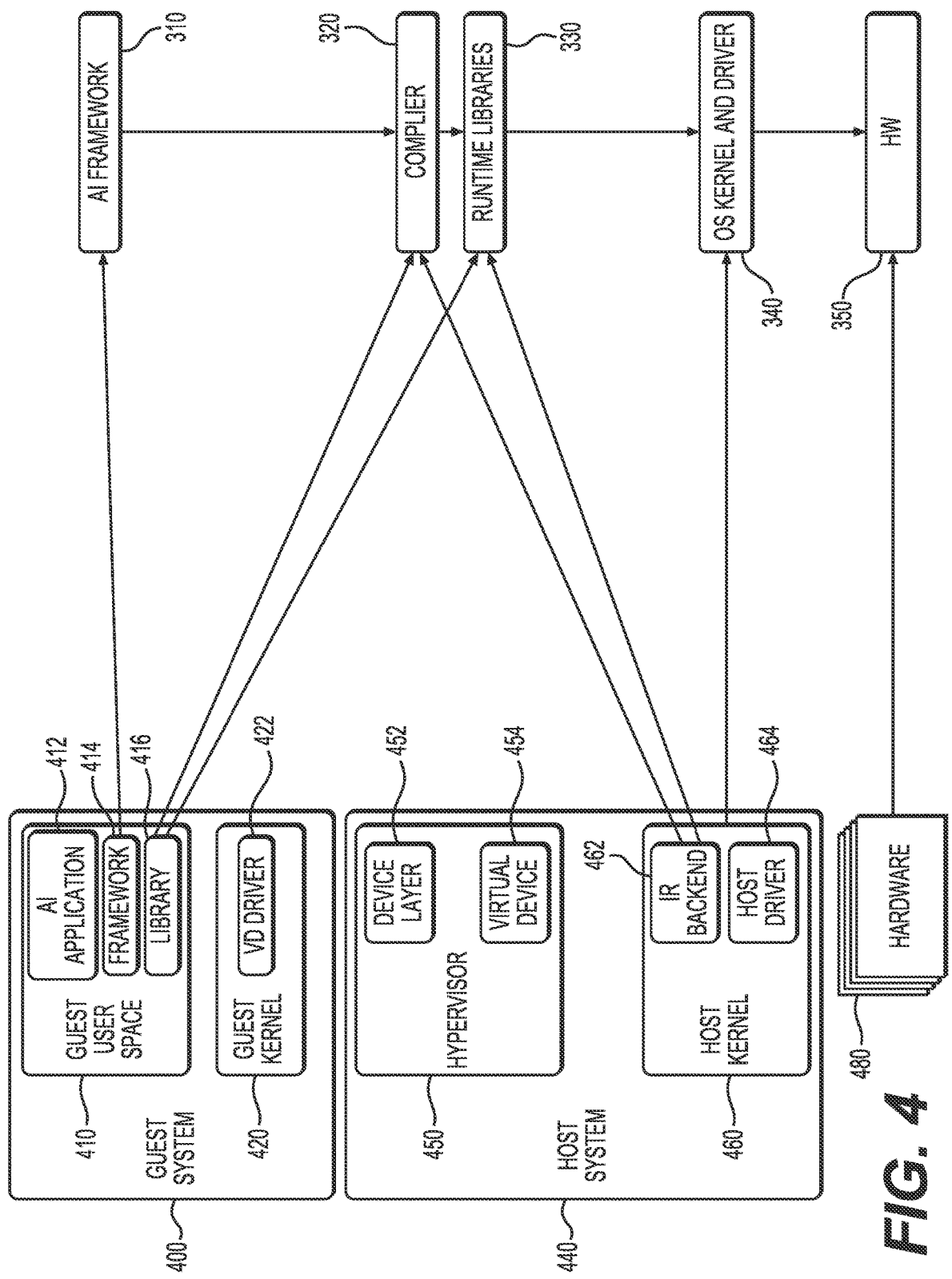
FIG. 4 illustrates an exemplary mapping of an AI architecture to an exemplary system configured to virtualize a hardware component, according to the present disclosure.
Figure 5:
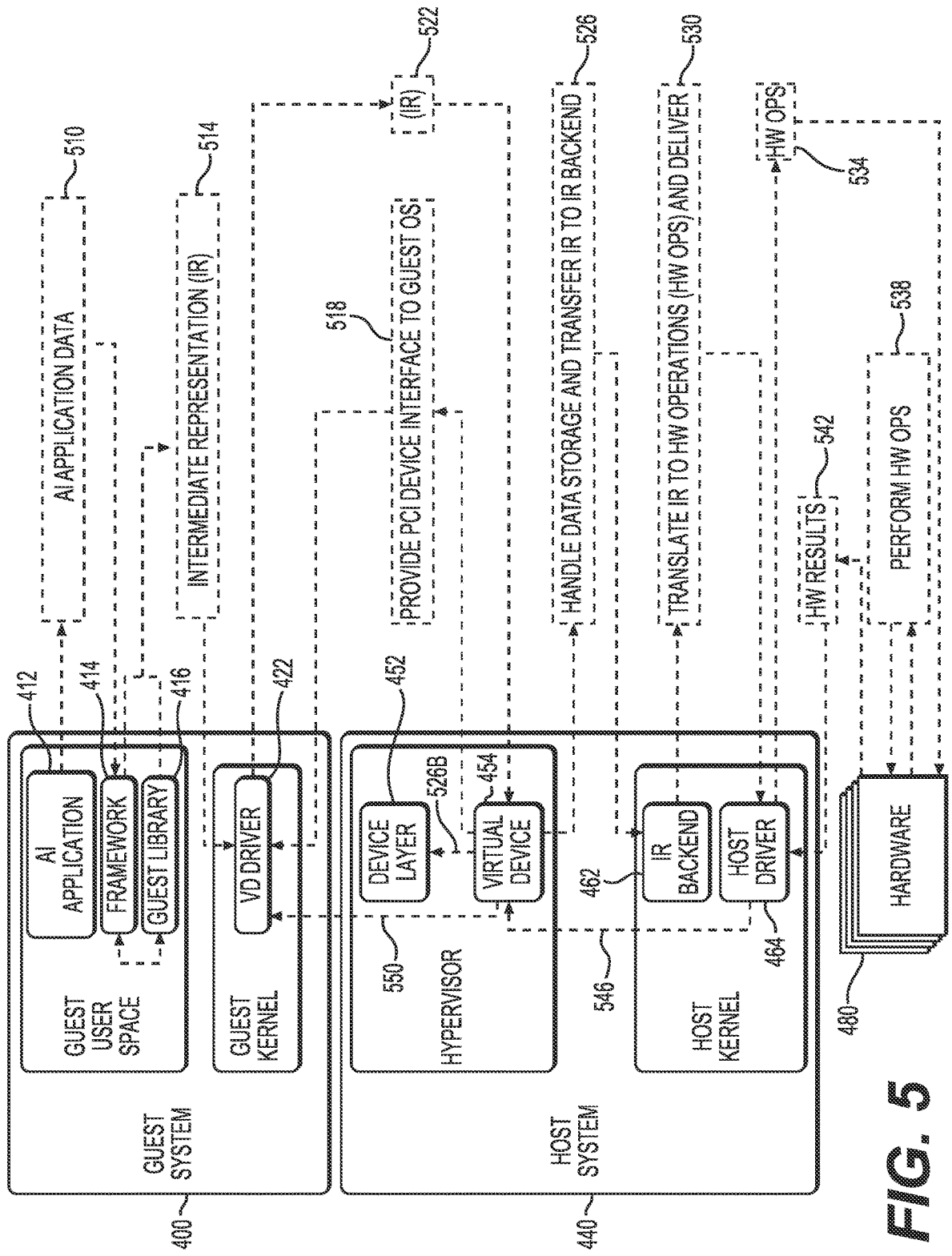
FIG. 5 illustrates a schematic representation of an exemplary process implemented by a system for virtualizing a hardware component.
Figure 6:
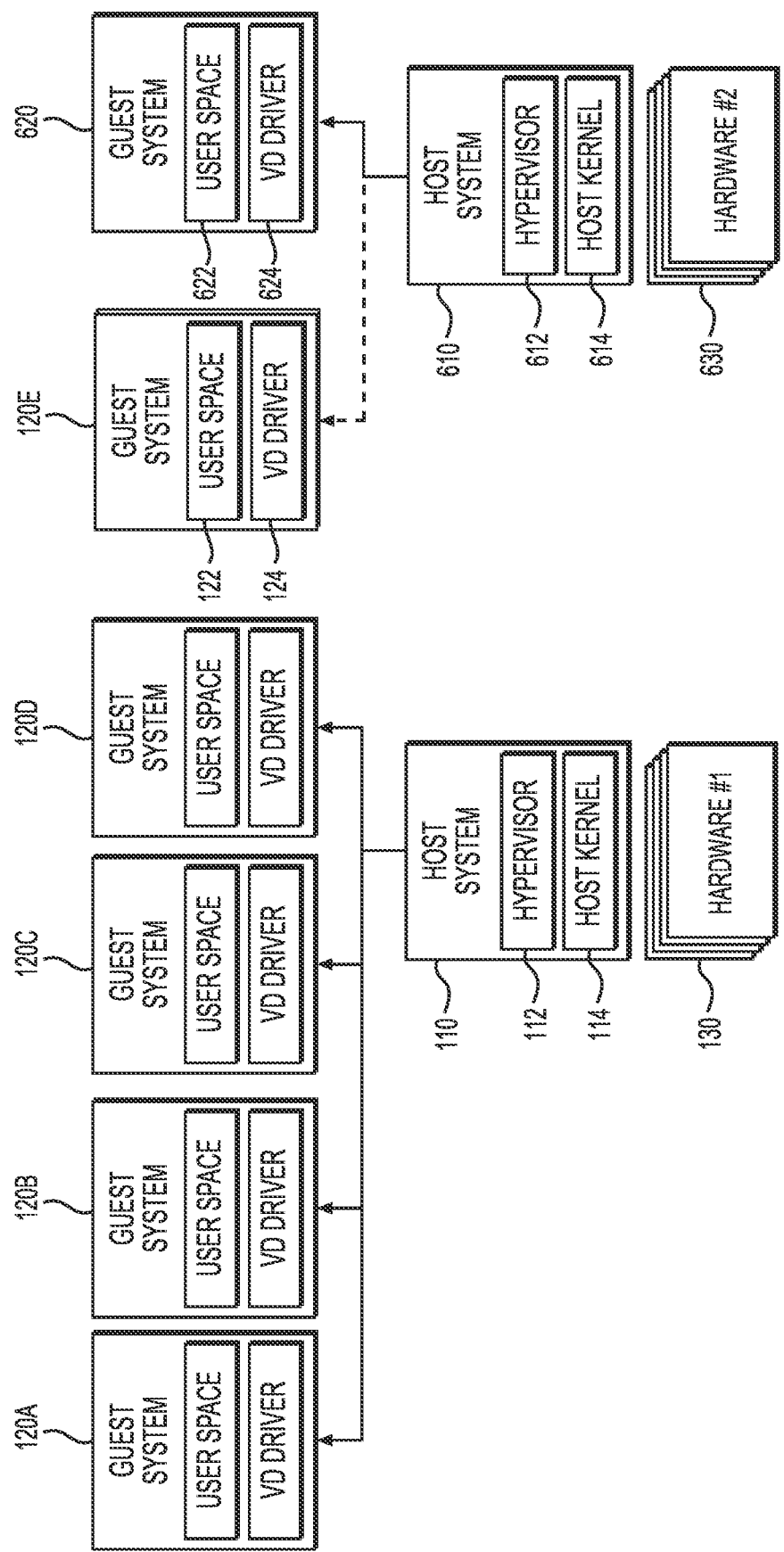
FIG. 6 is an exemplary illustration of system components for implementing a virtualized hardware component for a migrated guest system.

FIG. 1A is an exemplary illustration of system components for implementing a virtualized hardware component with respect to multiple guest systems. FIG. 1B provides a flowchart of an exemplary method for implementing a hardware component configured to handle AI workloads, through a virtualized environment. FIG. 2A provides a detailed sequence diagram for a portion of the method of FIG. 1B that includes generating an IR. FIG. 2B provides a detailed sequence diagram for a portion of the method of FIG. 1B that includes implementing an AI application with an IR and a hardware component through a virtualized environment. FIG. 3 illustrates an exemplary AI architecture generally configured to incorporate a hardware component(s) according the present disclosure. FIG. 4 illustrates an exemplary mapping of an AI architecture to an exemplary system according to the present disclosure. The system is configured to implement an information flow of the AI architecture with the incorporation of a virtualized AI hardware component. FIG. 5 illustrates a schematic representation of an exemplary process implemented by a system for virtualizing a hardware component consistent with the methods described with respect to FIGS. 1B, 2A, and 2B. FIG. 6 is an exemplary illustration of system components for implementing a virtualized hardware component for a migrated guest system.

Turning to FIG. 1A, an illustration of system components for implementing a virtualized hardware component 130 is shown. Operation of the hardware component 130 may be caused by a host system 110 in order to implement one or more AI applications. As described herein, the host system 110 can cause the appropriate operations of the hardware component 130 as a result of calls to respective AI applications provided in guest systems 120A-E that are executed by the host system 110.

With respect to the system of components illustrated in FIG. 1A, and any other aspect of the present disclosure, "virtual," "virtualization," or "virtualized" can refer to the process of creating a virtual (rather than physical) version of computer hardware platforms, storage devices, and computer network resources. Virtualization can facilitate the management and resource use in a centralized computing center comprising computer systems and associated components, such as communications and storage systems. Virtualization can enable the creation of a computing center and increase efficiency through automation while also reducing planned and unplanned downtime.

A host system, such as host system 110, may be implemented by a server, computing device, or network of multiple servers or computing devices, having one or more processors and memory stores. Thus, a host system can generally include a group, or "cluster," of host computing devices. In addition, a host system, such as host system 110, can refer to a virtual representation of computing and memory resources of a physical machine having memory and a processor. Accordingly, a host system can represent the aggregate computing and memory resources of a physical server or other computing device, or a group of servers or other computing devices.

A host system can include, implement, and maintain a hypervisor 112, which can execute, manage, and maintain one or more guest systems, such as guest systems 120A-E. The hypervisor 112 can be implemented by a set of persistent files stored as part of a system image, that is, a hypervisor system image. A hypervisor system image can include, among other files, boot files for booting the hypervisor 112; installation files for implementing a kernel, kernel modules, device drivers, and applications/services of the hypervisor 112; and configuration files that establish a persistent configuration of the hypervisor 112.

Notably, the configuration files in the hypervisor system image can include configuration data for the hypervisor 112, such as a network address, hostname, and the like, as well as an inventory of guest systems registered with the hypervisor 112. The configuration data can also include information related to global behavior of guest systems, such as which guest systems belong to specific groups (for example, clusters, resource groups, etc.), which are enabled for certain functions, and which are enabled for implementation of certain AI applications. The hypervisor 112 can save the configuration data on persistent storage (for example, with a hypervisor system image) so that the configuration data persists when the hypervisor is shutdown or rebooted.

A guest system, such as guest systems 120A-E, can be executed by a host system, and implemented on a user device. A user device may be constituted by any computing device such as a phone, computer, laptop, tablet, or other device having a processor and a memory. A guest system of the present disclosure may also be referred to as a virtual machine ("VM"), as known in the art. Accordingly, a guest system can generate an abstraction of physical computing resources, such as a processor and memory, that executes the guest system. The guest system can include a "guest" kernel that additionally executes a "guest" operating system, which, in turn, executes one or more software applications. The abstracted resources can be functionally indistinguishable from the underlying physical resources with respect to the OS implemented in the guest kernel and the software applications.

In one example, an AI application is any software application or platform that implements an AI methodology or process, to process and analyze information in some form of data. Such methodologies may include, for example, machine learning, neural networks, deep machine learning, or the like. Further, an AI application is any software application that when executed, implements a respective AI-methodology with the objective of training or otherwise causing a computing system to operate in a manner that mimics cognitive functions that a person may associate with other human minds, such as learning and problem solving.

With specific reference to FIG. 1A, each guest system 120A-E is configured to operate and perform processes in coordination with the host system 110. Each of the guest systems 120A-E may be executed on a respective computing device in communication with the host system 110. Each of the computing devices can be enrolled with the host system 110 as part of an enterprise computing infrastructure.

Each guest system 120A-E includes a respective guest user space 122 and VD driver 124. Further, each VD driver 124 is configured to transmit IRs generated by a framework and library of the guest user space 122 for a respective one of the guest systems 120A-E, in response to calls to an AI application for that guest system. More specifically, each VD driver 124 is configured to transmit respective IRs, according to one or more send and receive queues implemented by that VD driver 124, to a virtual device of a hypervisor 122 of the host system 110. In one example, an IR received by the virtual device for the host system 110 may be received and handled by at least one queue implemented by the virtual device.

Each of the guest systems 120A-E may implement a different AI application or a different framework. However, in accordance with the present disclosure, each user space 122 includes a guest library that operates in conjunction with a respective framework to translate high-level programming language of a respective AI application into an IR that can be translated by an IR backend operating in a host kernel 114 of the host system 110. With IRs from each of the guest systems 120A-E sharing a format and including language components keyed to an IR library for the IR backend, the IR backend can translate each of the transmitted IRs into HW OPS that enable actuation and control of the hardware component 130.

Turning to the flowchart of FIG. 1B, stage 150 can include receiving a request to implement an AI application. In particular, the AI application may be provided through, or accessible by, a guest system that provides a virtualized computing environment. The guest system may be implemented on a user device and maintained by a hypervisor of a host system.

At stage 160, information defining a guest system AI framework ("framework") can be accessed, along with a library maintained on the guest system ("guest library"). The framework and guest library can be utilized by the guest system to compile data from the AI application ("AI application data") and generate an intermediate representation ("IR"). In addition, the guest system can transmit the IR to the host system at stage 160.

The framework can be an abstraction in which software providing generic functionality can be selectively changed by additional user-written code, thus providing application-specific software. Generally speaking, a software framework can provide a unified way to build and deploy applications. Further, a software framework can be a universal, reusable software environment that provides particular functionality as part of a larger software platform to facilitate development of software applications, products, and solutions. Software frameworks may include support programs, compilers, code libraries, tool sets, and application programming interfaces ("APIs") that bring together all the different components to enable development of a project or system.

In addition to having some or all of the aspects of a general-purpose software framework previously described, the framework can include an interface configured to build a model for AI applications. These models use learning algorithms to accomplish a task or solve a problem. The algorithms in a sense train the models to accomplish particular tasks. In one example, the algorithms may be enhanced through particular techniques, such as training or inference methods, for processing data.

The terms "compile" and "compiler" can refer to any process or type of device for analyzing, organizing, summarizing, or otherwise altering of data. In some examples, compiling includes organizing the data according to a specific construct or system architecture. In one example, the framework accesses the guest library with the AI application data. Using definitions stored in the guest library, an IR is generated by the framework and the guest library from the AI application data.

The IR can be a data structure or code that may be used by a compiler or virtual machine to provide a representation of source code. An IR can be: a representation of a program considered "between" a source language and a target language; substantially independent of source and target languages; and capable of use by different compilers. As is known in the art, an IR can be provided in different forms, for example, as an in-memory data structure, a special tuple-based code, or a stack-based code. In one example, the IR can provide a generic command or data structure that can be translated into a specific command or data element, which can be used by hardware to perform specific operations. Accordingly, an IR provides a data element that defines an intermediate form of operations and data from a guest system/VM, that a virtual device can use to facilitate a translation of those operations and data into specific commands a hardware component can understand as operations the hardware component can and is going to perform.

At stage 170, the IR having been received by the host system, can be translated into hardware operations ("hardware operations" or "HW OPS") for a hardware component configured to handle AI workloads, such as a hardware-based AI accelerator, associated with the host system. Translating the IR can include an IR backend, which includes an IR library, executing binary translation, or another translation methodology, to extract the HW OPS to be performed by the hardware component.

At stage 180, the hardware component associated with the host system, for example a GPU, ASIC, FPGA, or the like, can perform the HW OPS. Following stage 180, results of the HW OPS can be stored in the host system and transmitted to the guest system at stage 190.

The implementation of an IR as described herein enables the virtualization of an AI hardware device, such as a hardware-based AI accelerator. In order to accomplish this, systems and methods of the present disclosure define and implement an interface between a hardware component and an OS kernel through use of IRs. Implementations of an IR backend, an IR library, and guest libraries, as well as systems for enabling operations by a VD to parse an IR and by the VD and a VD driver to queue IRs, are based on primitives shared by different hardware components. Specifications for these primitives are utilized to devise algorithms for creating, parsing, and translating the IRs. The system adaptive method of pushing down hardware operation through the IR enable implementations of drivers, virtual devices, VD drivers, and libraries to virtualize hardware components configured to handle AI workloads. As a result, AI functionalities of an AI hardware component that is associated with a host system, can be utilized agnostically to implement different AI applications running on different guest systems maintained by the host system.

At stage 190, as noted above, results of the HW OPS can transmitted a VD driver for the guest system. In one example, the VD driver, or a combination of the guest library and the framework, can convert the transmitted results into a results IR. In addition, the guest system can use the results IR to format the transmitted results for use by the AI application.

FIG. 2A provides a sequence diagram for an exemplary method for generating an IR for the method of FIG. 1. In stage 210, a guest user space for a guest system can receive a request for an AI application to be run. In one example, a user of the guest system may utilize an interface provided by the guest system to select the AI application. In another example, a call to the AI application can be initiated by a function or procedure performed in another application being implemented through the guest system.

At stage 214, the method can include the guest user space accessing a framework with the AI application call. Based on the AI application call, the framework can obtain AI application data and initiate a process for compiling the AI application data.

Stage 222 can include the framework communicating with a guest library in order to compile the AI application data. Then, at stage 226, an IR can be instantiated based on: the compiled application data; definitions provided by the guest library; and two-way communication between the framework and the guest library.

At stage 230, the guest library can send the IR to a VD driver. The method can optionally include stage 231 for an exemplary VD driver that maintains one or more queues. At stage 231, VD driver can determine how the IR will be assigned (in what order) relative to other elements held in the queue, and if it maintains multiple queues, which of the queues to assign to the IR. For example, the VD driver may hold IRs for multiple applications operating on a user device, and each IR may be given a position with a particular, send queue in order to manage the order in which the IRs are transmitted to the host system. In one example, the VD driver may implement rules for an order for sending the IRs that are directed to processing requirements each IR may require of a hardware component. In another example, the VD driver may order the IRs in multiple send queues, each send queue implementing a respective condition before an IR held in that queue may be transmitted to the host system. For example, one of the send queues could require an indication from the host system that an IR can be accepted. In still another example, the IRs may be ordered for transmission according an order in which they are received by the VD driver.

FIG. 2B provides a sequence diagram of an exemplary method of implementing an AI application with a hardware component through a virtualized environment. In one example, a host system may execute, and communicate with a VD driver of, a guest system configured to perform the sequence illustrated in FIG. 2A. The host system can include: a hypervisor that provides a device layer and a virtual device; and a host kernel provided with an IR backend and a host device driver ("host driver"). At stage 250, the VD driver can transmit the IR to the VD.

In one example, the method can optionally include stage 251 in which the VD driver can update a send/receive status for the queues the VD driver maintains. In one example, the queue from which the IR was sent can be a send/receive queue, and the VD driver can update the status of the queue to a receive status for information associated with the IR. Accordingly, any subsequent information received by the VD driver that is not associated with the IR in a specified manner will not be directed to the queue. In another example, the status of the queue could be set to receive for new IRs, and another queue maintained by the VD driver may be set to a receive status for subsequent information associated with the IR transmitted in stage 250.

In one example, the VD driver can continuously execute stage 251 in order to monitor which queue status settings are being changed based on rules implemented by the VD driver. For example, the VD driver can keep track of a time that a given queue has had a receive status subsequent to sending an IR to the VD, and enforce a reset procedure for situations where a predetermined period of time has elapsed and an information package related to the IR has not been received. As a result, the status of the queue may be reset to receive a new IR, or to obtain the previous IR again for transmission to the VD. In one example, the VD can obtain the previous IR by accessing a backup copy stored on the VD, or through a communication with the guest library through the VD driver.

Turning to the VD, the VD can be configured to perform specific information exchanges, and provide an information handling system. In particular, the VD can: receive the IR; parse the IR into data and control parts; and forward those parts along to the appropriate components of a host system and guest systems supported by the host system. Further, the VD can be described as providing a peripheral component interconnect ("PCI") interface between a guest system and a hardware component.

At stage 254, the VD can parse the IR received from the VD driver in stage 250. Tables 1 and 2 provide example statements that may be included in an IR, and recognized by the VD as corresponding to data and control operations. Table 2 also provides a correlation between the statements and a control operation performed as a result of a control part of the IR including those statements.

TABLE 1

Exemplary Operation Statements
for Data Part of IR
Data Operation
Statements

Abs
Acos
Add
And
ArgMax
ArgMin
Asin
Atan
AveragePool
BatchNor
Cast
Ceil
Clip
Concat
Constant
Conv

TABLE 2

Exemplary Operation Statements
for Control Part of IR

| Control Operation Statement | Corresponding Operation |
| --- | --- |
| SuspendQR ResumeQR RetrieveStateQR RecreateStateQR | Suspend & Resume |

At stage 258, the VD can ensure that the appropriate components in a device layer of the hypervisor receive the control parts of the IR identified in stage 254. As a result of the transmission of the control parts to the device layer of the hypervisor, operations defined by an IR to control virtual devices to do advanced operations of virtualization may be implemented. With this design, implementations of virtual devices can be normalized to enable advanced virtualization features and improved execution efficiency.

At stage 262, the VD can transmit the data parts of the IR to an IR backend. Prior to receiving the IR data parts, the IR backend can execute a survey of hardware available to the host system and a device driver for the host system ("host driver"). The IR backend can update translation elements in the IR library, or prioritize a particular set of translation elements, based on the results of the survey at stage 256.

At stage 268, the IR backend can translate the data parts of the IR into operations to be performed by the hardware. In one example, the IR can be presented in binary code, and the IR backend can employ a method of binary translation to translate the IR while referencing an IR library for the translation.

At stage 272, the IR backend can transmit the HW OPS to the device driver for the host system. The method at stage 276 can include the device driver establishing a connection with hardware, and directing operations of the hardware to perform the HW OPS in stage 278.

At stage 280, the hardware can transmit, through the host driver or directly in another example, the results of the HW OPS to the VD. At stage 284, the VD can update a send/receive status for the appropriate queues corresponding to or specified in stage 264.

At stage 288, the results can be transmitted to the VD driver. In one example, stage 288 can include the VD driver, or a combination of the guest library and the framework, converting the transmitted results into a results IR. Stage 288 can further include the guest system using the results IR to format the transmitted results for use by the AI application.

FIG. 3 illustrates an exemplary AI architecture 300 generally configured to incorporate a hardware component(s), such as a hardware-based AI accelerator, in the implementation of an AI application. The AI architecture includes an AI framework 310, one or more compilers 320, one or more runtime libraries 330, an OS kernel 340 including one or more drivers, and a hardware component 350. The AI architecture 300 is arranged in FIG. 3 in such a way so as to characterize and exemplary flow of information during an implementation of an AI application.

The AI framework 310 can be an abstraction in which software providing generic functionality can define or provide a tool configured to build a model, such as a mathematical model, for AI applications. In one example, the AI framework 310 can include inter alia, user space codes. In the context of the AI architecture 300, the AI framework 310 can pass information about an application in a form that can be compiled by the compiler 320 through reference to the runtime libraries 330. In one example, the runtime libraries 330 can include AI low level and generic math libraries. The compiled information can be processed in the OS kernel 340 configured to control the hardware component 350 based on the compiled information.

Each of the components of the AI architecture of FIG. 3 may be provided by a variety of options that may include one or more devices, software stacks, systems, or a combination thereof. For example, many options may be available for an AI framework, such as TENSORFLOW, CAFFE, MXNET, or the like. Options for compilers and runtime libraries are also numerous. In addition, different operating systems, such as LINUX and WINDOWS, can be utilized with the other components in a respective AI architecture, to control the operation of a hardware-based AI accelerator. Some examples of the hardware-based AI accelerators that provide HW component 350 in a respective AI architecture could be a GPU, ASIC, FPGA, or the like.

Absent the systems and methods described herein with reference to FIGS. 1A, 1B, 2A, 2B, 5, and 6, the heterogeneity with respect to the different levels of overall AI architectures can present many challengers for developers and end users. For example, with vendors and system developers, issues can arise with respect to maintaining tools from an application level to a very low level (e.g., drivers), and maintaining these tools for different OS platforms and versions. From the standpoint of application developers, the same application may have to be written for different platforms, and reusing optimization technologies may not possible. From the stand point of end users, they may be required to learn different platforms, and deploy different environments for different HW. Further, end users often times may experience difficulties, or are entirely prohibited from: (1) migrating from one platform to another, or (2) distributing workloads to different hardware components concurrently.

Turning to FIG. 4, illustrates an exemplary mapping of an AI architecture to an exemplary system configured to virtualize a hardware component, according to the present disclosure. The system includes a guest system 400, a host system 440, and a hardware component 480. In one example, the guest system 400 includes a guest user space 410 and a guest kernel 420, and the host system 440 includes a hypervisor 450 and a host kernel 460.

The guest user space 410 may implement, or define an interface that enables implementation of an AI application 412. As shown, the guest user space 410 also includes a framework 414 and a guest library 416. In one example, the framework 414 and the guest library 416, together, compile and translate high level language of the AI application 412 into an IR, as explained in more detail with reference to FIG. 5.

The guest kernel 420 may implement a guest OS for the guest system 410 and include a VD driver 422. The VD driver 422 is configured to communicate with the framework 414 and the guest library 416, as well as a virtual device 454 of the hypervisor 450.

In addition to the virtual device 454, the hypervisor 450 includes a device layer 452. The device layer 452 can be controlled by the virtual device 454 according to a control component of an IR transmitted from the VD driver 422 to the virtual device 454.

The host kernel 460 includes an IR backend 462 and a host driver 464. In one example, the IR backend 462 can include a backend library specific to IR data and a compiling component. The compiling component can be configured to use the backend library to translate an IR into hardware operations for the hardware component 480.

FIG. 4 also shows how the system, which includes the guest system 400, the host system 440, and the hardware component 480, maps to the AI architecture 300 illustrated in FIG. 3. As shown, the AI framework 310 is provided by the framework 414. Aspects of the compiler 320 map to the framework 414, the guest library 416, and the IR backend 462. The IR backend 462 and guest library 416 for the guest system 400 map to the runtime libraries 330 of the AI architecture 300. The OS kernel and driver 340 and the HW 350 map to the host kernel 460 and the hardware 480, respectively.

FIG. 5 illustrates a schematic representation of an exemplary process implemented by a system for virtualizing an AI hardware component. At stage 510, pursuant to a call to the AI application 412, AI application data in the form of high-level language, in one example, can be communicated to the framework 414. In one example, the call to the AI application can be generated as a result of a user selecting the AI application using a user interface provided by the guest user space 410. In another example, the call to the AI application can be provided by another application operating on the guest system 400.

In one example, the AI application data can be codes written in a general-purpose programming language, such as an interpreted, high-level, general-purpose programing language, like PYTHON. One such example of AI application data that may be passed to the framework 412 may include the following:

$t$=app.ones([3,4], dtype=app.float64, device='device0')

At stage 514, the framework 414 and the guest library 416 translate the AI application data into an IR in the guest system 400. In one example, the codes constituting the AI application data are converted into an IR with reference to the guest library 416. An example of an IR converted from the above example of AI application data communicated in stage 510 is provided below:

Tensor $t$=CPU(kFloat).ones ({3,4})

In addition to generating the IR in stage 514, the combination of the framework 414 and the library 416 deliver or pass the IR to the VD driver 422. The VD driver 422 in essence provides a pathway for the IR to be transmitted to the host system 440 in stage 522, and in particular, to the virtual device 454.

Stage 526 includes the initial operation by the virtual device 454 of parsing the IR into a control part and a data part. This is done so that in sub-stage 526A, the data part can be transmitted by the virtual device 454 to the IR backend 462; and in sub-stage 526B, the control part can be transmitted to the device layer 452 of the hypervisor 450. Both of these sub-stages can respectively include storage by the virtual device 454 of the data and control parts in a memory component of the host system.

As shown in FIG. 5, once the data part of the IR is received in the IR backend 462, it is translated by the IR backend 462 into HW OPS which are passed to the host driver 464 in the same stage.

In one example the host driver 464 can provide a hardware driver for the hardware 480. Translation of the data part of the IR is accomplished with an IR backend 462. In one example, the IR backend 462 functions as a binary translator that converts the IR into hardware operations. In another example, the IR backend includes an IR library configured for use in translating different hardware operations for different hardware platforms from IRs following a unified format and written in one language.

In one example, the IR backend 462 can operate as part of the host driver 464. In yet another example, the IR backend 462 can operate or be run as part of a device layer. The IR backend 462 can be agnostic to the type of OS being implemented by the host kernel 464, or otherwise able to fully integrate with multiple types of OSs. Thus, regardless of the OS run by the host kernel 460, the IR backend 462 is configured to translate a received IR into hardware operations of the hardware 480, whatever the device that may embody the hardware 480.

Continuing with the example of the AI application data provided in stage 510, an example of HW OPS translated from the IR of the above example provided in stage 514 may include:

```
_global_void VecAdd(float*A, float*B, float*C)
{
    int i=thread [dx.x;]
    C[i] =A[i] +B[i]
}
```

The HW OPS, once received by the host driver 464, are transmitted to the hardware 480 in stage 534. This can include a command from the host driver 464 to perform the HW OPS in stage 538, or an instruction to delay execution or performance of the HW OPS in stage 538 for a period of time or until provided with authorization from the host driver 464. In one example, the HW OPS may be any operation directed toward processing information according to an AI construct. Based on the above example, the HW OPS may include the following:

MOV reg0 1, ADD reg0 reg1

Upon completion of the HW OPS, results of the HW OPS can be transmitted to the host driver 464, the virtual device 454, and the VD driver 422 at stages 542, 546, and 550 respectively. The VD driver 422, or a combination of the guest library 416 and the framework 414, can convert the transmitted results into a results IR. In addition, the guest system 400 can use the results IR to format the transmitted results for use by the AI application 412.

The solution of the present disclosure separates compilation and translation that may each occur in other AI architectures at a single level, into a multi-level approach. To accomplish this, binary translation may be implemented in at least one level of a system according to the present disclosure, in order to effectively virtualize relative to guest systems, hardware components configured to handle AI workloads.

In the systems illustrated in FIGS. 1A, 4, and 5, operation of each VD driver is decoupled from a virtual device for a hypervisor of a host system. What this means is that, in the case of the system components illustrated in FIG. 1A, for example, any of the guest systems 120A, B, C, D, or E can be migrated to any host system other than the host system 110. The other host system implementing an IR backend configured to translate IRs into HW OPS. Regardless of whether this other host system supports or implements a different hardware platform, an IR provided by the migrated guest system will be translated into HW OPS that can be performed by the hardware operated by the other host system.

FIG. 6 is an exemplary illustration of system components for implementing a virtualized AI hardware accelerator with a migrated guest system. As shown, the guest system 120E ("first guest system 120E") has been migrated from host system 110 ("first host system 110") to a second host system 610. As used herein, "migration", "migrating", or "migrate" can refer to the process of selecting, preparing, extracting, and transforming data, and transferring it from one computer storage system to another. Accordingly, this can include the process of moving guest systems to from one host system to another. Additionally, the validation of migrated data for completeness and the decommissioning of legacy data storage can be considered part of migration.

In one example, the system components illustrated in FIG. 6 may be part of an enterprise computing infrastructure ("infrastructure"). The first host system 110 may be implemented on a first server, or a first group of servers, for the infrastructure. The infrastructure may also include a second server that implements the second host system 610, which executes at least the one second guest system 620. The second guest system 620 can be implemented on a computing device that is enrolled in the enterprise computing infrastructure, and be different from any computing device implementing any of the guest systems 120A-E.

In one example, subsequent to migration of the first guest system 120E to the second host system 610, the first guest system 120E can transmit an IR to a virtual device of a second hypervisor 612 of the second host system 610. In one example, the transmitted IR could be an IR previously transmitted by the VD driver 124 to the first host system 110 prior to migration. In one example, the second virtual device for the second hypervisor 612 can have, in a respective queue: (a) the IR from the first guest system 120E; and (b) an IR from the second guest system 620. As such, the second virtual device can transmit the IRs to a second host kernel 614 according an order that is determined by rules implemented by the queue for the second virtual device. Rules implemented by the second virtual device can, for example, prioritize or subrogate IRs from migrated guest systems with respect to IRs from guest systems originally executed (instantiated) by the second host system 610, or relative to IRs from guest systems the virtual device has previously received an IR from (regardless of origin).

Further to the example immediately above, the second host system 610 can be associated with a second hardware component 630 that is a different type of hardware component than the hardware component 130 ("first hardware component 130"). An IR backend residing in the second host kernel 614 of the second host system 610 can translate the IR of the first guest system 120E into second hardware operations for the second hardware component 630. A host driver for the second host kernel 614 can cause the second hardware component 630 to perform the second hardware operations. According to an aspect of the present disclosure, results of the second hardware operations can be the same as results of the hardware operations performed by the first hardware component 130.

While the present disclosure includes examples suited for VMWARE-based implementations, it is to be understood that examples of the present disclosure can be used in connection with any suitable virtualized network implementation.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented is only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for virtualizing hardware components, the method comprising:
   generating an intermediate representation ("IR") of data from an artificial intelligence (AI) application that executes on a guest system;
   receiving the IR at a virtual device executing in a hypervisor of a host system that maintains the guest system;
   transmitting the IR from the virtual device to an IR backend, wherein the IR backend utilizes a library to translate the IR into a hardware operation for artificial intelligence ("AI") accelerator hardware associated with the host system;
   causing the AI accelerator hardware to perform the hardware operation; and
   transmitting results of the hardware operation to the guest system.

2. The method of claim 1, wherein the IR is generated at the guest system using a framework defining parameters of a model and a processing method for training the model.

3. The method of claim 2, wherein the IR is transmitted from a guest library maintained on the guest system to the virtual device, the virtual device having send and receive queues for handling IRs transmitted between the host and guest systems.

4. The method of claim 1, further comprising transmitting the hardware operation from the IR backend to a device driver of the host system.

5. The method of claim 1, wherein the IR is transmitted to the virtual device by a driver that maintains send and receive queues for IR.

6. The method of claim 1, wherein the virtual device parses the IR into a data part and a control part, wherein the virtual device transmits the data part to an IR backend for translation separately from the data part.

7. The method of claim 1, further comprising:
   migrating the guest system to a second host system that is associated with a second AI accelerator hardware;
   translating the IR into a second hardware operation;
   causing the second AI accelerator hardware of the second host system to execute the second hardware operation; and
   transmitting results of the second hardware operation to the guest system.

8. A non-transitory, computer-readable medium comprising instructions that, when executed by a processor, perform stages for virtualizing hardware components, the stages comprising:
   generating an intermediate representation ("IR") of data from an artificial intelligence (AI) application that executes on a guest system;
   receiving the IR at a virtual device executing in a hypervisor of a host system that maintains the guest system;
   transmitting the IR from the virtual device to an IR backend, wherein the IR backend utilizes a library to translate the IR into a hardware operation for AI accelerator hardware associated with the host system;
   causing the AI accelerator hardware to perform the hardware operation; and
   transmitting results of the hardware operation to the guest system.

9. The non-transitory, computer-readable medium of claim 8, wherein the IR is generated at the guest system using a framework defining parameters of a model and a processing method for training the model.

10. The non-transitory, computer-readable medium of claim 9, wherein the IR is transmitted from a guest library maintained on the guest system to the virtual device, the virtual device having send and receive queues for handling IRs transmitted between the host and guest systems.

11. The non-transitory, computer-readable medium of claim 8, the stages further comprising transmitting the hardware operation from the IR backend to a device driver of the host system.

12. The non-transitory, computer-readable medium of claim 8, wherein the IR is transmitted to the virtual device by a driver that maintains send and receive queues for IR.

13. The non-transitory, computer-readable medium of claim 8, wherein the virtual device parses the IR into a data part and a control part, wherein the virtual device transmits the data part to an IR backend for translation separately from the data part.

14. The non-transitory, computer-readable medium of claim 8, the stages further comprising:
   migrating the guest system to a second host system that is associated with a second AI accelerator hardware;
   translating the IR into a second hardware operation;
   causing the second AI accelerator hardware of the second host system to execute the second hardware operation; and
   transmitting results of the second hardware operation to the guest system.

15. A system for virtualizing hardware components, the system comprising:
   an artificial intelligence ("AI") accelerator hardware; and
   at least one processor that executes a first host system to carry out stages comprising:
      generating an intermediate representation ("IR") of data from an artificial intelligence (AI) application that executes on a guest system;

receiving the IR at a virtual device executing in a hypervisor of a host system that maintains the guest system;

transmitting the IR from the virtual device to an IR backend, wherein the IR backend utilizes a library to translate the IR into a hardware operation for AI accelerator hardware associated with the host system;

causing the AI accelerator hardware to perform the hardware operation; and transmitting results of the hardware operation to the guest system.

16. The system of claim 15, wherein the IR is generated at the guest system using a framework defining parameters of a model and a processing method for training the model.

17. The system of claim 16, wherein the IR is transmitted from a guest library maintained on the guest system to the virtual device, the virtual device having send and receive queues for handling IRs transmitted between the host and guest systems.

18. The system of claim 15, the stages further comprising transmitting the hardware operation from the IR backend to a device driver of the host system.

19. The system of claim 15, wherein the IR is transmitted to the virtual device by a driver that maintains send and receive queues for IR.

20. The system of claim 15, wherein the virtual device parses the IR into a data part and a control part, wherein the virtual device transmits the data part to an IR backend for translation separately from the data part.

* * * * *